United States Patent [19]

Hackel

[11] Patent Number: 4,845,878
[45] Date of Patent: Jul. 11, 1989

[54] ICE FISHING HOLE COVER AND TIP UP

[75] Inventor: Ronald L. Hackel, Abbotsford, Wis.

[73] Assignee: Diversified Enterprises of America, Inc., Abbotsford, Wis.

[21] Appl. No.: 231,996

[22] Filed: Aug. 15, 1988

[51] Int. Cl.⁴ .................... A01K 97/01; A01K 97/12
[52] U.S. Cl. ........................................................ 43/17
[58] Field of Search ................................... 43/16, 17

[56] References Cited

U.S. PATENT DOCUMENTS

| | | | |
|---|---|---|---|
| 2,618,091 | 11/1952 | Sheraski | 43/17 |
| 2,654,176 | 10/1953 | Kachelski et al. | 43/17 |
| 3,578,748 | 5/1971 | Hurd | 43/17 |
| 3,745,689 | 7/1973 | Williams | 43/17 |
| 4,253,262 | 3/1981 | Johnson | 43/17 |
| 4,310,983 | 1/1982 | Irvin et al. | 43/17 |
| 4,651,460 | 3/1987 | Sykes | 43/17 |
| 4,685,240 | 8/1987 | Fralick | 43/17 |

Primary Examiner—Nicholas P. Godici
Assistant Examiner—William Scott Andes
Attorney, Agent, or Firm—Andrus, Sceales, Starke & Sawall

[57] ABSTRACT

An ice fishing hole cover and tip up device for fishing with a fishing line through a hole in ice. The device includes a housing which rests atop the ice and is dimensioned to cover an ice fishing hole formed in the ice, a shaft extending between opposite sides of the housing and journaled therein for rotation with respect to the housing with one end projecting from one side of the housing, a fishing line spool carried on the shaft and rotatable therewith to play out and reel in fishing line, a signal flag movable between a set position engageable with the projecting end of the shaft and a tripped position disengaged from the shaft, and a spring for biasing the signal flag toward its tripped position. In its set position, the signal flag is engaged within a detent notch formed in the projecting end of the shaft and is tripped by rotation of the shaft so that a beveled surface on the projecting end of the shaft permits the signal flag to become disengaged from the end of the shaft in response to playing out of fishing line. The trigger tension can also be adjusted for preferred release of the flag.

16 Claims, 1 Drawing Sheet

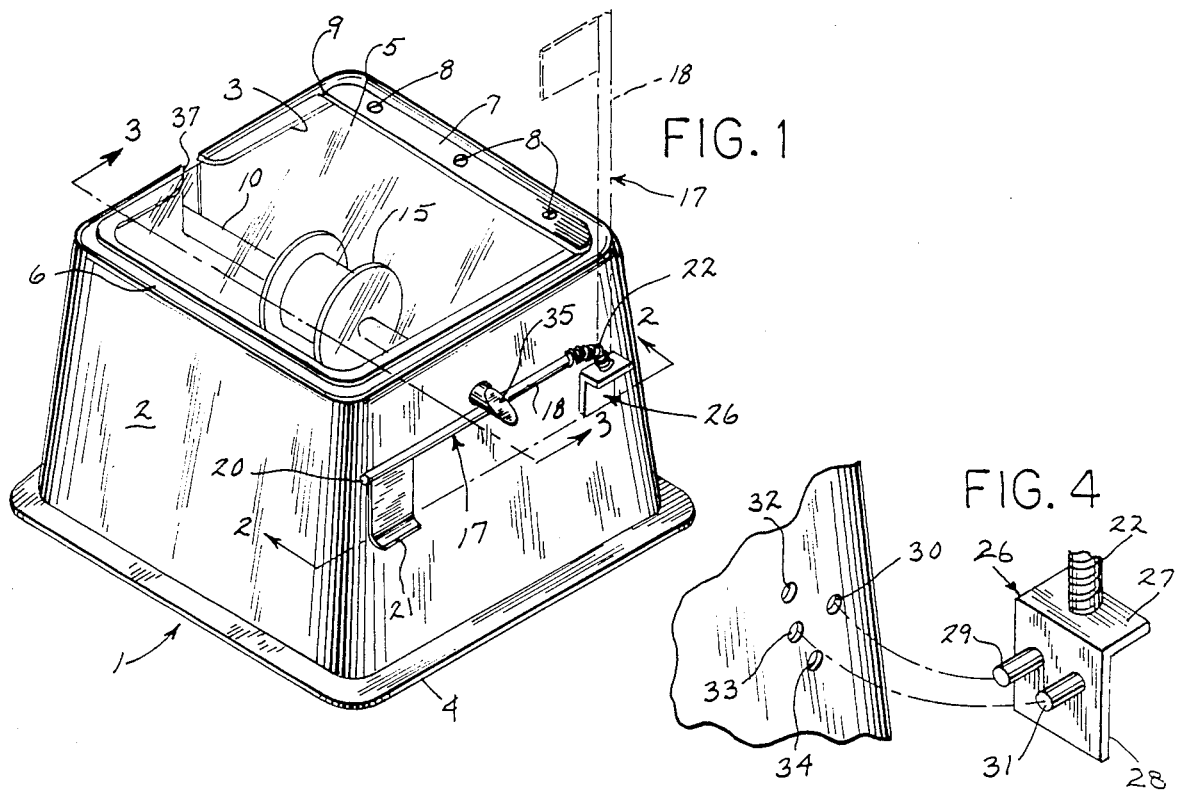
FIG. 1
FIG. 4
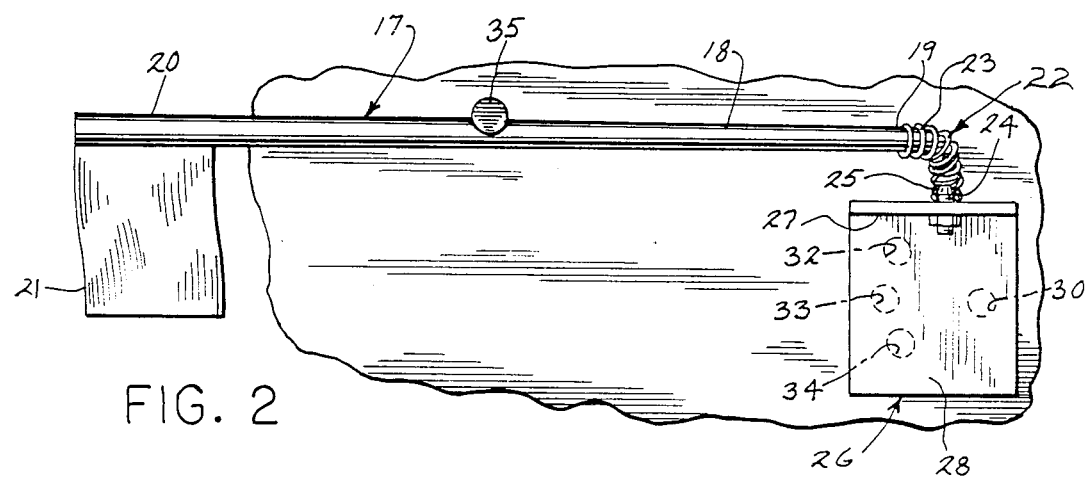
FIG. 2
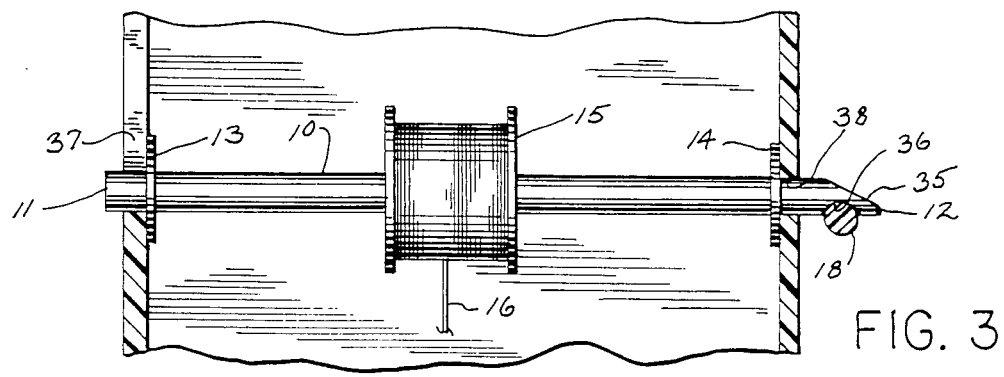
FIG. 3

ICE FISHING HOLE COVER AND TIP UP

BACKGROUND OF THE INVENTION

The present invention relates to fishing equipment, and more particularly to an ice fishing hole cover and tip up device for fishing with a fishing line through a hole in ice.

In the sport of ice fishing, an opening or hole is typically drilled through ice to permit access to the water. In relatively cold weather, the fishing hole has a tendency to freeze over particularly where the hole may be unattended for a relatively long period of time.

Various types of ice fishing hole covers and tip up devices are known. Examples of such devices can be found in the following United States patents:

| U.S. Pat. No. | Inventor | Issue Date |
|---|---|---|
| 4,310,983 | Irvin et al | 01-19-1982 |
| 4,253,262 | Johnson | 03-03-1981 |
| 3,745,689 | Williams | 07-17-1973 |
| 3,578,748 | Hurd | 05-18-1971 |
| 2,618,091 | Sheraski | 11-18-1952 |

None of the above devices, however, have been completely satisfactory or widely employed.

SUMMARY OF THE INVENTION

An ice fishing hole cover and tip up device for fishing with a fishing line through a hole in ice.

The device includes a housing adapted to rest atop the ice which is dimensioned to cover an ice fishing hole formed in ice. The device also includes a shaft extending between and journaled in opposite sides of the housing for rotation with respect to the housing and having one of its ends projecting from one side of the housing. A fishing line spool is carried on the shaft and is rotatable with the shaft to play out and reel in fishing line. A signal means is mounted on said one side of the housing and is movable between a set position engageable with the projecting end of the shaft and a tripped position disengaged from the projecting end of the shaft. Biasing means provides a biasing force against the signal means for biasing the signal means towards its tripped position.

The device also includes trip means releasably engageable with the signal means to permit movement of the signal means from its set position to its tripped position in response to rotation of the shaft. The trip means comprises a beveled surface on the projecting end of the shaft positioned opposite the signal means when the signal means is in its set position and rotatable with the shaft to release the signal means from the shaft when in its tripped position in response to playing out of fishing line. The trip means may also include detent means for holding the signal means in its set position which, in a preferred form, comprises a notch disposed diametrically opposite of the beveled surface.

The device is designed to protect the fishing hole from the cold, and will reduce the formation of ice in the fishing hole. The device may be anchored in place with snow and has only one small slot through which wind can enter the interior of the housing. Additionally, the slot may be easily positioned away from the wind to reduce to a minimum the problem of ice crystalizing in the fishing hole. There are no lubricated parts to freeze up, and the trigger tension or biasing force can be adjusted easily for preferred release of a signal flag. In order to accomplish this, a flag bracket is loosened and turned clockwise to increase the tension required to trigger the tip up or by turning the bracket counterclockwise the tension is reduced allowing for less trigger tension for lighter biting fish. The housing of the device may also be tapered to allow compact, stacked storage.

BRIEF DESCRIPTION OF THE DRAWINGS

The drawings illustrate the best mode presently contemplated of carrying out the invention.

In the drawings:

FIG. 1 is a perspective view of an ice fishing hole cover and tip up constructed in accordance with the principles of the present invention;

FIG. 2 is a fragmentary enlarged side elevational view illustrating the signal flag and its mounting arrangement taken along the plane of the line 2—2 in FIG. 1;

FIG. 3 is a fragmentary cross sectional view illustrating the fishing line spool and shaft taken along the plane of the line 3—3 in FIG. 1; and FIG. 4 is a fragmentary enlarged perspective view illustrating the tension adjustment mechanism for the signal flag.

DESCRIPTION OF THE PREFERRED EMBODIMENT

Referring now to the drawings, FIG. 1 illustrates an ice fishing hole cover and tip up generally designated by the numeral 1 for fishing through a hole in ice. The tip up 1 includes a housing 2 having an open top 3 and an open bottom (not shown) together with four upstanding side walls forming a box like configuration. Side walls of housing 2 are preferably tapered outwardly from its open top 3 to its open bottom so that the open bottom is larger than the open top 3. This tapering of the side walls allows compact, stacked storage and/or shipment. A flange 4 is disposed about the lower edges of the side walls of housing 2 which enables housing 2 to rest atop the ice and provide a means for anchoring housing 2 by banking the sides and covering flange 4 with snow. The bottom opening of housing 2 should be sufficiently dimensioned to cover the desired size fishing hole and thus may be manufactured to various dimensions.

A lid 5 composed of a transparent material such as plexiglas covers the open top 3 of housing 2. The upper edges of the side walls of housing 2 include an inwardly directed flange 6 which supports and provides a seal for lid 5 when lid 5 is in its closed position covering the open top 3. Lid 5 includes a leaf portion 7 which is mounted to one portion of flange 6 by a plurality of screws 8. A hinge 9 such as a "living" hinge (if lid 5 is composed of plexiglas) permits lid 5 to be moved between an opened position and a closed position as desired.

As shown best in FIG. 3, tip up 1 also includes a shaft 10 extending between opposite sides of housing 2 and having its opposite ends 11, 12 projecting therefrom and journaled therein for rotation with respect to housing 2. It should be noted that end 12 of shaft 10 projects slightly further from housing 2 than end 11, the purpose of which will hereinafter be described. Shaft 10 also includes a pair of thrust bearings or thrust washers 13, 14 disposed within the interior of housing 2 adjacent its side walls to prevent excessive lateral movement of shaft 10.

A fishing line spool 15 is carried on shaft 10 for rotation therewith to play out and reel in fishing line 16. Spool 15 may be of any conventional design typically employed with fishing line 16.

Tip up 1 also includes a signal flag 17 mounted on one side of housing 2 and movable between a set position, as shown in solid lines in FIG. 1, engageable with projecting end 12 of shaft 10 and a tripped position, as shown in phantom in FIG. 1, disengaged from end 12 of shaft 10. As shown best in FIG. 2, signal flag 17 includes a rod 18 having an inner end 19 and an outer end 20 mounting a flag 21.

As a means for providing a biasing force against signal flag 17 for biasing signal flag 17 toward its tripped position, tip up 1 includes a coil spring 22 having one end 23 encircling the inner end 19 of rod 18, and its other end 24 encircling a peg 25 projecting from a mounting bracket 26 for mounting signal flag 17 on the side of housing 2. As shown best in FIG. 2, peg 25 may comprise a projecting member such as the head of a screw mounted on bracket 26.

As shown best in FIG. 4, bracket 26 is L-shaped and includes a short leg 27 mounting peg 25 and spring 22, and a long leg 28 extending substantially parallel to the side of housing 2. Bracket 26 is pivotally mounted on the side of housing 2 by means of a stub shaft 29 projecting from leg 28 and received within an opening 30 formed in the side of housing 2. As a stop means for holding bracket 26 in a predetermined position to provide a desired spring tension, there is provided a pin 31 projecting from leg 28 of bracket 26 engageable within one of three pin-receiving openings 32-34 formed in the side of housing 2. There is thus provided a means for adjusting or varying the biasing force or spring tension applied against signal flag 17. This is accomplished by simply loosening flag bracket 26 and turning it clockwise to increase the tension required to trigger signal flag 17 or turning bracket 26 counterclockwise to decrease the tension required to trigger signal flag 17 for lighter biting fish.

As shown best in FIGS. 2 and 3, the means for triggering or tripping signal flag 17 to permit movement of signal flag 17 from its set position, as shown in FIG. 1, to its tripped position, as shown in phantom in FIG. 1, comprises a beveled surface 35 formed on end 12 of shaft 10. As shown best in FIG. 3, beveled surface 35 is postioned on the opposite side of shaft 10 from the engaged position of rod 18 when signal flag 17 is in its set postion. Beveled surface 35 is rotatable with shaft 10 to release signal flag 17 from shat 10 in response to playing out of fishing line 16 from spool 15 since as beveled surface 35 engages the surface of rod 18, rod 18 will slide axially outwardly along surface 35 until it is released from the edge of end 12 of shaft 10 due to the tension force of spring 22. It should also be noted that the trigger or trip means further includes detent means on end 12 of shaft 10 for holding signal flag 17 in its set position. As shown, this detent means comprises a notch 36 disposed diametrically opposite of beveled surface 35 on end 12 of shaft 10. Notch 36 is also located axially between the ends of beveled surface 35 to ensure that as shaft 10 rotates the surface of rod 18 engages beveled surface 35.

In order to minimize freeze up problems involved in cold weather conditions, tip up 1 reduces to a minimum the amount of wind entering the interior of housing 2. This is accomplished by having only a single slot 37 through which wind can enter the interior of housing 2. Slot 37 is formed in the side wall opposite the mounting of signal flag 17 and extends downwardly from its upper edge and is dimensioned to slidably receive shaft 10 yet permit easy rotation of shaft 10 therein. The opposite end 12 of shaft 10 projects through and is journaled in a hole 38 formed in the side wall of housing 2.

In operation, after baiting line 16 and setting line 16 in the water at the desired depth for fishing, signal flag 17 is set by positioning rod 18 in notch 36 on end 12 of shaft 10. When a strike occurs and line 16 is played out from spool 15, shaft 10 rotates to engage beveled surface 35 with rod 18 to permit rod 18 to slide over the outer edge of end 12 of shaft 10 so that signal flag 17 moves to its tripped position indicating a strike. A fisherman then opens the lid 5, pulls shaft 10 and spool 15 out of housing 2 and sets the hoook on the end of fishing line 16. The fish may then be brought in by turning shaft 10 and spool 15 in a hand-over-hand fashion. After removing the fish from line 16, shaft 10 and spool 15 is then replaced in housing 2 for continued fishing. The tension on signal flag 17 may be easily adjusted as previously described herein depending upon the type of fish desired to be caught.

Various modes of carrying out the invention are contemplated as being within the scope of the following claims particularly pointing out and distinctly claiming the subject matter regarded as the invention.

I claim:

1. An ice fishing hole cover and tip up device for fishing with a fishing line through a hole in ice, comprising:
   a housing having an open top, an open bottom and a plurality of upstanding sides, said housing adapted to rest atop the ice and dimensioned to cover an ice fishing hole formed in ice;
   a shaft extending between opposite sides of said housing and having its opposite ends journaled therein for rotation with respect to said housing and having one end projecting from one side of said housing;
   a fishing line spool carried on said shaft and being rotatable with said shaft to play out and reel in fishing line;
   signal means mounted on said one side of said housing and movable between a set position engageable with said one end of said shaft and a tripped position disengaged from said one end of said shaft;
   biasing means providing a biasing force against said signal means for biasing said signal means toward its tripped position; and
   trip means releasably engageable with said signal means to permit movement of said signal means from said set position to said tripped position in response to rotation of said shaft, said trip means comprising a beveled surface on said one end of said shaft positioned opposite said signal means when in said set position and rotatable with said shaft to release said signal means from said shaft when in said tripped position in response to playing out of fishing line.

2. The device of claim 1 further including anchoring means for anchoring said housing atop the ice.

3. The device of claim 2 wherein said anchoring means comprises a flange disposed about the bottom periphery of said sides.

4. The device of claim 1 wherein the sides of said housing are tapered outwardly from said open top to said open bottom so that said open bottom is larger than said open top.

5. The device of claim 1 further including a lid hingedly mounted on said housing and movable between an open position and a closed position covering said open top.

6. The device of claim 5 wherein said lid is composed of a transparent material.

7. The device of claim 1 wherein said trip means further includes detent means on said one end of said shaft for holding said signal means in its set position.

8. The device of claim 7 wherein said signal means includes a rod having one end mounted to said one side of said housing and said detent means comprises a notch disposed diametrically opposite of said beveled surface.

9. The device of claim 1 wherein said biasing means further includes adjustment means for varying the biasing force against said signal means.

10. The device of claim 9, wherein said biasing means comprises a spring providing a spring tension force against said signal means.

11. The device of claim 10 wherein said signal means includes a rod having inner and outer ends and said spring comprises a coil spring having opposite ends with one end encircling the inner end of said rod and its other end mounted to said one side of said housing.

12. The device of claim 11 wherein said adjustment means comprises a bracket pivotally mounted on said one side of said housing and having a peg projecting therefrom for receiving the other end of said coil spring.

13. The device of claim 12 wherein the pivotal mounting of said bracket comprises a stub shaft received within an opening formed in said one side of said housing.

14. The device of claim 13 wherein said adjustment means further includes stop means for holding said bracket in a predetermined position to provide a desired spring tension.

15. The device of claim 14 wherein said stop means comprises a pin projecting from said bracket engageable within a pin-receiving opening in said one side of said housing.

16. The device of claim 1 wherein said one end of said shaft projects through and is journaled in a hole formed in said one side of said housing and the other end of said shaft projects through and is journaled in a slot formed in said opposite side of said housing.

* * * * *